(12) United States Patent
George et al.

(10) Patent No.: US 9,080,701 B2
(45) Date of Patent: Jul. 14, 2015

(54) APPARATUS AND METHOD FOR HEATING A PIPE

(75) Inventors: Michael George, Burnley (GB);
Damian Daykin, Lancashire (GB);
Christopher Ratcliffe, Preston (GB)

(73) Assignee: Pipeline Induction Heat Limited, Burnley (GB)

( * ) Notice: Subject to any disclaimer, the term of this patent is extended or adjusted under 35 U.S.C. 154(b) by 1056 days.

(21) Appl. No.: 12/816,639

(22) Filed: Jun. 16, 2010

(65) Prior Publication Data
US 2010/0254687 A1 Oct. 7, 2010

(30) Foreign Application Priority Data
Oct. 29, 2009 (GB) .................................. 0918955.6

(51) Int. Cl.
*F24C 7/00* (2006.01)
*F26B 3/30* (2006.01)
*F16L 13/02* (2006.01)

(52) U.S. Cl.
CPC .................................. *F16L 13/0272* (2013.01)

(58) Field of Classification Search
None
See application file for complete search history.

(56) References Cited

U.S. PATENT DOCUMENTS

| | | | | |
|---|---|---|---|---|
| 3,147,794 A * | 9/1964 | Shupe et al. | ................... | 126/401 |
| 3,519,023 A * | 7/1970 | Burns, Sr. et al. | ............... | 138/33 |
| 3,675,905 A * | 7/1972 | Placek | .............................. | 432/24 |
| 3,729,360 A * | 4/1973 | McElroy | ......................... | 56/499 |
| 3,929,541 A * | 12/1975 | Spears et al. | .................. | 156/157 |
| 4,536,644 A * | 8/1985 | Thalmann | ...................... | 219/535 |
| 4,554,436 A * | 11/1985 | Chlosta et al. | ................ | 219/385 |
| 4,595,607 A * | 6/1986 | Betteridge et al. | ............ | 427/185 |
| 4,714,513 A * | 12/1987 | McAlister | ...................... | 156/359 |
| 4,749,843 A * | 6/1988 | Abramson | ..................... | 219/411 |
| 4,792,374 A * | 12/1988 | Rianda | ........................... | 156/503 |
| 4,918,292 A * | 4/1990 | Nussbaum et al. | ............ | 219/492 |
| 5,073,108 A * | 12/1991 | Kirby | .............................. | 432/225 |
| 5,124,533 A * | 6/1992 | Dommer et al. | .............. | 219/243 |
| 5,182,440 A * | 1/1993 | Dufour et al. | ................. | 219/535 |
| 5,364,130 A * | 11/1994 | Thalmann | ..................... | 285/21.2 |
| 5,830,312 A * | 11/1998 | Weimer et al. | ................ | 156/503 |
| 5,843,271 A * | 12/1998 | Andrew et al. | ............... | 156/499 |
| 6,230,745 B1 * | 5/2001 | Brooks | ............................ | 138/33 |
| 6,680,464 B1 * | 1/2004 | Carter et al. | ................... | 219/544 |
| 2004/0083957 A1 | 5/2004 | Latvis | | |
| 2012/0037297 A1 * | 2/2012 | Nardo | ............................... | 156/86 |
| 2012/0090765 A1 * | 4/2012 | Tailor et al. | ..................... | 156/86 |

FOREIGN PATENT DOCUMENTS

| | | |
|---|---|---|
| GB | 2262146 | 6/1993 |
| WO | 2010130345 | 11/2010 |

* cited by examiner

*Primary Examiner* — Thor Campbell
(74) *Attorney, Agent, or Firm* — Kofi Schulterbrandt; Michael P. Leary

(57) ABSTRACT

An apparatus for heating a pipe, having at least one heating unit, at least one temperature sensor and a controller, wherein the controller is arranged to control the at least one heating unit in dependence on the temperature measured by the temperature sensor.

18 Claims, 5 Drawing Sheets

APPARATUS AND METHOD FOR HEATING A PIPE

BACKGROUND

The present invention relates to an apparatus for heating a pipe and particularly although not exclusively to an apparatus for heating a pipe coating provided on a pipeline field joint.

Pipelines in the oil and gas industry are typically formed from many lengths of steel pipe that are welded together end-to-end as they are being laid. To prevent corrosion of the pipes, they are coated with one or more protective or insulative layers. The pipes are usually coated at a factory remote from the location in which they are to be laid. This is generally more cost effective than coating them on site. At the factory, the coating is applied to the outside of the pipes whereupon a short length is left uncoated at either end of the pipe. The uncoated ends are necessary to enable the pipes to be welded together to form the pipeline.

Before the pipeline can be laid the welded ends, known as field joints, must be coated in the region of the joint to prevent corrosion of the pipes. The coating in these regions is referred to as the field joint coating.

Polypropylene is widely used as a coating for pipes used to form pipelines. The pipe coating can take several different forms depending on the particular application and will normally consist of more than one layer. A conventional pipe coating will typically comprise a thin layer of a primer, such as an epoxy-based material, that is applied in either liquid or powdered form to the outer surface of the steel pipe. To ensure a good bond between the pipe and the primer, the pipe is typically blast cleaned and etched with an appropriate anchor pattern. In many applications, the primer is in powdered form and may be a Fusion Bonded Epoxy (FBE).

A second layer will then usually be applied over the primer during the curing time (i.e. time taken to harden or set) of the primer, so as to allow the two layers to bond. This second layer is typically a thin layer of polypropylene. A third layer, usually a thicker layer of extruded polypropylene, may then be applied on top of the second layer. This layer is typically 3 mm in thickness depending on the particular application. If a high degree of thermal insulation is not important, the third layer can serve as the outermost or final layer of the coating, in which case the coating is commonly referred to as a 3 layer polypropylene (3 LPP) type coating. Such coatings are widely used in pipelines where thermal insulation is not needed.

In pipeline applications where thermal insulation is important, a fourth layer may be applied comprising an extruded or foamed polypropylene-based material. Alternatively, the fourth layer may be a polypropylene layer that has been further modified to enhance its thermal insulation properties, e.g. such as syntactic polypropylene incorporating embedded hollow glass microspheres. Usually, such coatings will also include a fifth or final layer of a solid protective layer of polypropylene to improve the mechanical strength of the coating and protect the underlying layers from environmental damage.

A pipe coating of the above form is commonly referred to as a 5 layer polypropylene (5LPP) type coating. Such coatings are widely used in pipelines where a high degree of thermal insulation is required, and many other variations incorporating multiple additional layers can be employed to obtain the required combination of mechanical and thermal properties.

A common process for coating field joints of pipelines formed from polypropylene coated pipes is the Injection Moulded Polypropylene (IMPP) technique.

An IMPP coating is typically applied by first blast cleaning and then heating the pipe using induction heating, for instance. A layer of powdered FBE primer is then applied to the heated pipe, together with a thin layer of polypropylene—which is added during the curing time of the FBE. The areas of the factory applied coating at the ends of the pipes that have been welded together, including chamfered areas are then heated. The field joint and adjacent factory applied coating is then completely enclosed by a heavy duty mould that defines a cavity around the uncoated ends of the pipes, which is subsequently filled with molten polypropylene. Once the polypropylene has cooled and solidified, the mould is removed leaving the field joint coating in place.

Field joint coatings of the IMPP type provide similar or identical mechanical and thermal properties to the pipe coatings, as the factory applied coating and field joint coating materials are compatible thermoplastic materials. The compatibility of the pipe coating and field joint coating permits fusion to occur between the pipe and the field joint coatings provided that sufficient heat is present at the interface to facilitate the fusion process, thereby imparting great integrity to the finished coatings.

It is currently known to heat the exposed chamfers of factory applied coating on the pipe using radiant heating tubes. It is current practice to use no control of the heat produced by the heating tubes, or to use limited control such as through use of a simmerstat, which turns the heating tubes on and off for defined periods of time. The heating tubes are resistive elements which take a considerable period of time to heat up and cool down, which often means that the device must be switched on continuously if time is not to be lost waiting for the heating device to reach operating temperature at each field joint coating operation.

Applying field joint coatings as described above is a lengthy process. The pipe laying industry is a time critical environment and therefore there is motivation for pipe joints to be coated and pipes to be laid quickly.

This naturally provides an incentive to use high powered heating devices. The disadvantage resulting from the use of high rates of heat input is that there is a risk of overheating the surface of the pipe coating and oxidising the material of the surface, which will result in a weak interface.

Even if these devices do not overheat the surface, the material that is being heated is thermally insulating and there is a risk that the depth of heating that occurs may be very limited. In these cases, whilst the surface of the coating may be at the correct temperature at the end of the heating cycle, the temperature will decay very rapidly once the heater is removed.

In order to be effective the temperature needs to remain sufficiently high for fusion to occur for enough time to allow for the heater to be removed, the mould put in place, sealed and filled with molten thermoplastic. It is therefore preferable that the heated layer of the coating is not limited to the outer surface.

Once the joint coating has been moulded there is no non-destructive means by which to verify whether bonding has taken place or not. It is therefore desirable to perform the heating process in a controlled manner so that once satisfactory process parameters have been established during pre-production testing, there can be confidence that the process will be repeatable and continue to produce good results in production.

Operators using the existing uncontrolled heaters use a variety of means to establish the appropriate heating time; this often involves prodding the surface of the pipe coating with a suitable rod (often a welding rod) and making a subjective judgement as to when to remove the heater. In these cases the integrity of the finished product is entirely in the hands of the operator, and cannot be verified.

Existing heaters cannot take account of environmental changes such as varying ambient temperatures or air movement in the working area.

The need for existing heaters to be continuously switched on leads to significant heating of the heating device itself, including the framework and reflective surfaces. This can lead to handling difficulties. The hot reflective surfaces are also subject to contamination by any airborne particles of powder including the FBE and polyolefin primer layers which are applied to the field joint in the same working area. These materials are designed to adhere to hot surfaces and react to form a coating on the heated surface. The reflective surfaces can therefore be inadvertently coated by these materials, greatly reducing their effectiveness.

Embodiments of the present invention seek to overcome the above problems.

According to a first aspect of the invention there is provided an apparatus for heating a pipe, comprising at least one heating unit, at least one temperature sensor and a controller, wherein the controller is arranged to control the at least one heating unit in dependence on the temperature measured by the temperature sensor.

According to a second aspect of the invention there is provided a method of heating a pipe comprising providing an apparatus for heating a pipe having at least one heating unit and at least one temperature sensor, and controlling the at least one heating unit in dependence on the temperature measured by the temperature sensor.

Since the at least one heating unit is controlled in dependence on the measured temperature, the temperature may be accurately controlled to maintain a desired stable value. In addition, over-heating of the heating unit can be prevented.

The at least one heating unit may be arranged to heat a surface of the pipe.

The at least one heating unit may be a radiant heater. The radiant heater may comprise electrical heating tubes.

The electrical heating tubes may be of a type that reach operating temperature immediately after a power supply is applied and/or cool down quickly when the power supply is removed.

The radiant heater may be of a type that emits short wave infra-red heat energy. This is advantageous in that it provides good heat penetration of a surface, allowing deeper heating resulting in the surface remaining hot for longer after the heater has been removed.

The at least one temperature sensor may be arranged to measure the temperature of the surface of the pipe.

The at least one temperature sensor may be an optical pyrometer. The optical pyrometer may be arranged such that it makes no physical contact with the surface to be heated.

The apparatus may comprise a plurality of said heating units. The heating units may be arranged such that in use they each primarily heat different regions of the pipe.

The apparatus may comprise a plurality of said temperature sensors. The temperature sensors may be arranged to measure the temperature of different regions of the pipe.

The controller may be arranged such that each heating unit may be controlled individually. Selected groups of heating units may be controlled together. The controller, heating units and temperature sensors may be arranged such that each heating unit may be controlled in dependence on the measured temperature of the region of the pipe that the heating unit is arranged to heat.

In this way, different regions of the pipe may be heated differently. This accommodates differing responses of regions of the pipe to heating. These differing responses may, for example, be due to the spatial positions of the regions of the pipe.

For example, upper regions of the pipe may be subject to convected heat from lower regions of the pipe and therefore may not require as much heat to be applied directly to them. These differing responses may also, for example, be due to different materials of the regions, which have different specific thermal capacities.

The number and arrangement of the regions that the at least one heating unit is arranged to heat and that the at least one temperature sensor is arranged to measure the temperature of may be varied to suit the particular application.

For example, effects on regions of the pipe due to convection of heat may differ depending on the horizontal or vertical orientation of the pipe that is being heated. The number and arrangement of said regions may be varied in order to accommodate these effects.

The apparatus may be for heating a coating of the pipe.

The apparatus may be mountable on the pipe. The apparatus may be removably mountable on the pipe.

The apparatus may comprise a frame. The frame may be adjustable between a closed position and an open position.

The frame may be arranged such that in the closed position it may be attached to the pipe. The frame may be arranged such that in the closed position the frame at least substantially surrounds the pipe.

The frame may be arranged such that in the open position the frame may be removed from the pipe. This allows the heating apparatus to be removed from the pipe, once the pipe has been sufficiently heated.

One or more sections of the frame may be pivotally mounted to another in order to allow the frame to be adjustable between the open and closed positions.

The frame may comprise two elongate sections which have a general C-shaped cross-section and extend in a longitudinal direction. The sections may be pivotally connected to each other by a hinge. The hinge may have an axis that is substantially parallel to the longitudinal axis of the sections.

The heating apparatus may comprise a means to allow the pipe to be moved into and out of the heating apparatus while the heating apparatus is in the closed position.

The heating apparatus may comprise a switch, which only allows activation of the at least one heating unit when the heating apparatus is in the closed position.

The at least one heating unit may be provided on the frame. The at least one heating unit may be arranged on the frame such that it may heat the pipe when the frame is mounted on the pipe in the closed position.

The at least one temperature sensor may be provided on the frame. The at least one temperature sensor may be arranged on the frame such that it may measure the temperature of the pipe when the frame is mounted on the pipe in the closed position.

The controller may be arranged to receive the temperature measured by the at least one temperature sensor. The controller may be arranged to receive a target temperature for the pipe.

The controller may be arranged to use the measured temperature of the pipe by way of closed loop feedback control to control the at least one heating unit such that the temperature of the pipe is maintained at the target temperature.

The method may comprise controlling the at least one heating unit, using the temperature measured by the at least one temperature sensor, by way of closed-loop feedback control, to control the at least one heating unit such that the temperature of the pipe is maintained at the target temperature.

The controller may be arranged to receive a target temperature for one or more regions of the pipe. The controller may be arranged to use the measured temperature of the one or more regions of the pipe by way of closed loop feedback control to control the at least one heating unit such that the temperature of the one or more regions of the pipe is maintained at the target temperature.

The controller may be arranged to execute at least one heating cycle. The controller may be arranged to execute a plurality of heating cycles. The at least one heating cycle may be programmable.

The controller may be arranged to receive a run-time that the at least one heating unit is to heat the pipe. The controller may be arranged to receive a run-time that each heating unit is to heat each region of the pipe.

The controller may be arranged to control the at least one heating unit to maintain a maximum temperature until a target temperature is reached. The controller may be arranged to then control the heat supplied to the region in dependence on the measured temperature of the region, using closed loop feedback control to hold the region of the pipe at the target temperature. Once the run-time has elapsed the controller may deactivate the heating unit.

The controller may be arranged to control the at least one heating unit to maintain a maximum temperature for a first period of time, after which the controller may control the at least one heating unit using said closed loop feedback control.

The controller may be arranged to set the maximum temperature of the at least one heating unit at any time during a cycle. The at least one operator input may comprise the level of maximum temperature.

The method may comprise heating a region of the coating of the pipe to an extent sufficient to allow the heated region of coating to fuse with a field joint coating. The method may further comprise applying a coating to the field joint.

All of the features described herein may be combined with any of the above aspects, in any combination.

BRIEF DESCRIPTION OF THE DRAWING FIGURES

For a better understanding of the invention, and to show how embodiments of the same may be carried into effect, reference will now be made, by way of example, to the accompanying diagrammatic drawings in which.

DETAILED DESCRIPTION OF THE PREFERRED EMBODIMENT

Figure 1:
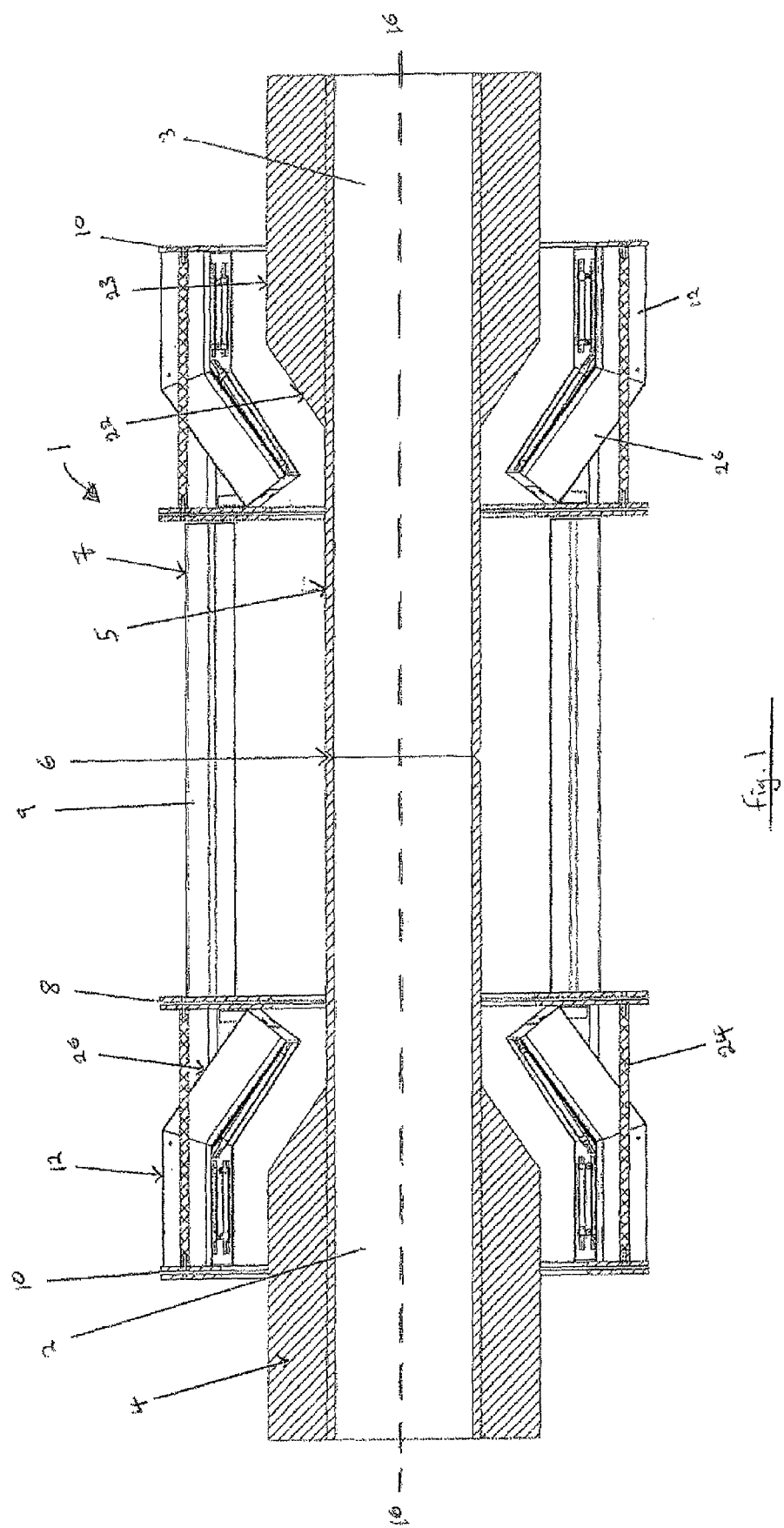
FIG. 1 shows a horizontal cross-sectional view of a heating apparatus according to the present invention mounted on a coated pipe.
Figure 2:
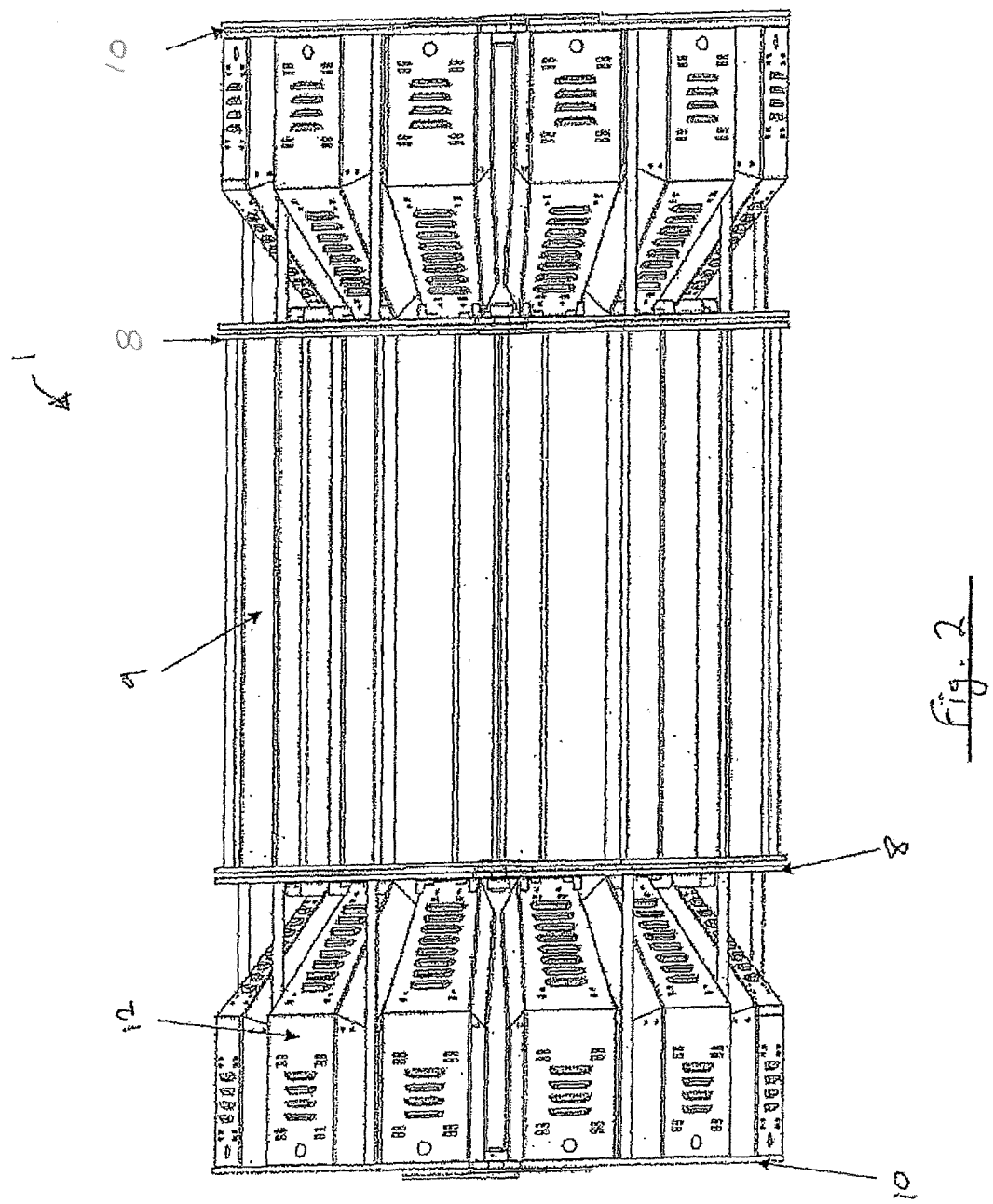
FIG. 2 shows a side elevational view of the heating apparatus shown in FIG. 1.

Referring to FIGS. 1 to 5, there is shown a heating apparatus 1.

The heating apparatus 1 comprises a frame 7 which is formed as two separate longitudinal halves 13, 14, connected to each other by a hinge 15 having an axis that is substantially parallel to the longitudinal axis 16 of the frame 7.

Each longitudinal half 13, 14 of the frame 7 comprises a pair of C-shaped inner frame members 8 pivotally connected by the hinge 15. The inner frame members 8 are spaced apart in the longitudinal direction and are joined by longitudinally extending stringers 9, distributed around the periphery of the inner frame members 8.

Each end of each half 13, 14 of the frame 7 is provided with an outer frame member 10. Each outer frame member 10 comprises a pair of C-shaped sections which are pivotally connected by the hinge 15. Each outer frame member 10 is attached to a respective adjacent inner frame member 8 by circumferentially distributed struts 24.

Figure 4:
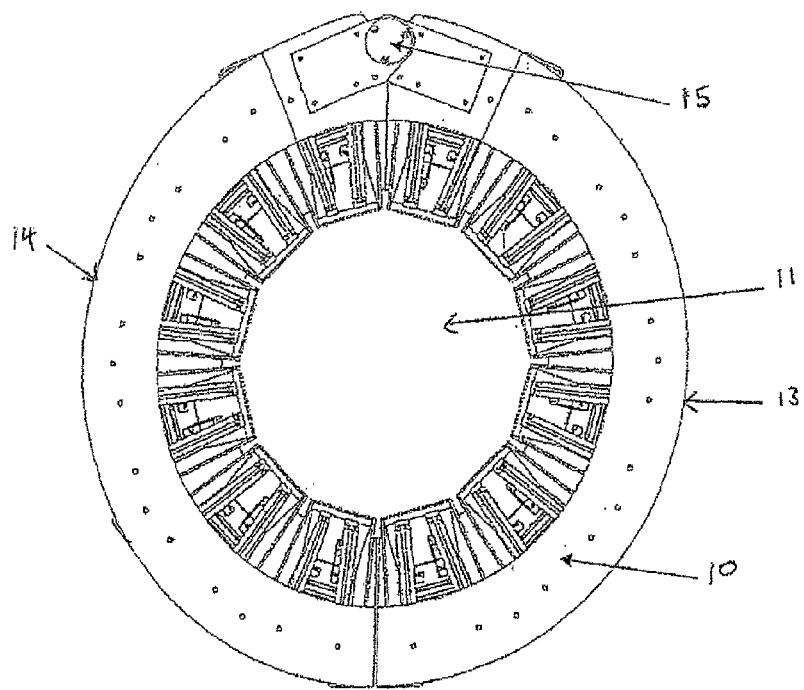
FIG. 4 shows a front elevational view of the heating apparatus of FIGS. 1 to 3 in a closed position.
Figure 5:
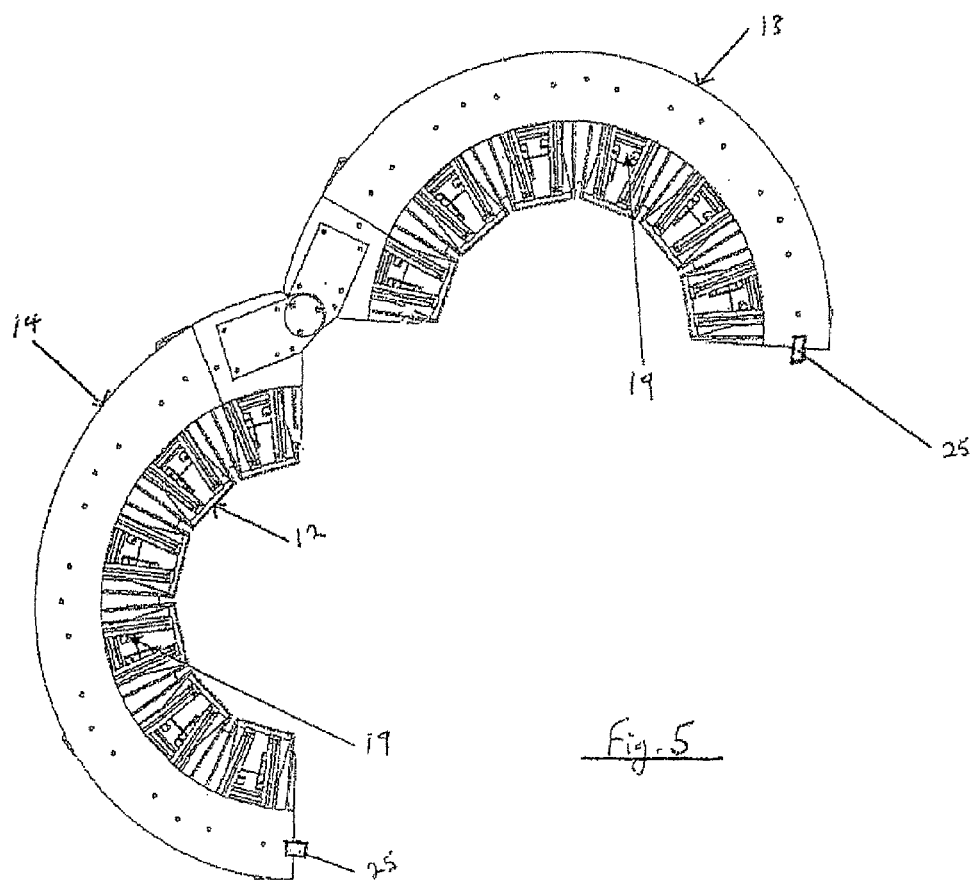
FIG. 5 shows a front elevational view of the heating apparatus of FIG. 4 in an open position.

The frame 7 is adjustable between an open position, as shown in FIG. 5 and a closed position as shown in FIG. 4, in which it has a generally annular cross-section, by pivoting the frame 7 about the hinge 15.

When in the open position, the heating apparatus 1 may be mounted onto pipes 2, 3, over a field joint 6. The two halves 13, 14 of the frame 7 may then pivoted towards each other, about the hinge 15, until the frame 7 is closed.

Alternatively, the heating apparatus may comprise a fixed one-piece section provided with an opening, arranged such that the pipes 2, 3 may be moved into and out of the heating apparatus 1.

Heating units 12,26 are mounted on the frame 7 towards each of its ends, between adjacent pairs of the inner and outer frame members 8, 10. The heating units 12,26 at each end of the frame 7 are circumferentially distributed around the periphery of the frame 7.

The heating units 12,26 are radiant heating units. As can be seen from FIG. 6, each heating unit 12,26 comprises a pair electrically powered radiant heating tubes 27.

The heating units 12,26 are arranged to direct heat towards pipes 2, 3 on which the frame 7 is mounted, when the frame is in the closed position.

The heating units 12,26 are arranged such that when the frame 7 is mounted on the pipes 2, 3, and is in the closed position, the heating units 12 are circumferentially disposed around the end region of the coating 4 of each pipe 2, 3, such that they substantially extend around the circumference of the pipes 2, 3.

When the frame 7 is mounted on pipes 2, 3 and the frame 7 is closed, each heating unit 12,26 is arranged to extend substantially parallel to the surface to be heated.

Accordingly, as can be seen from FIG. 1, each heating unit 12 is substantially parallel to the longitudinal axis 16 of the heating apparatus 1, and each heating unit 26 is inclined inwardly, to match the shape of the chamfered edge of the pipe coating 4, when the frame 7 is mounted on the pipes 2, 3 in the closed position.

This ensures that the chamfered edge of the pipe coating 4 is uniformly and sufficiently heated by the heating units 26.

Figure 6:
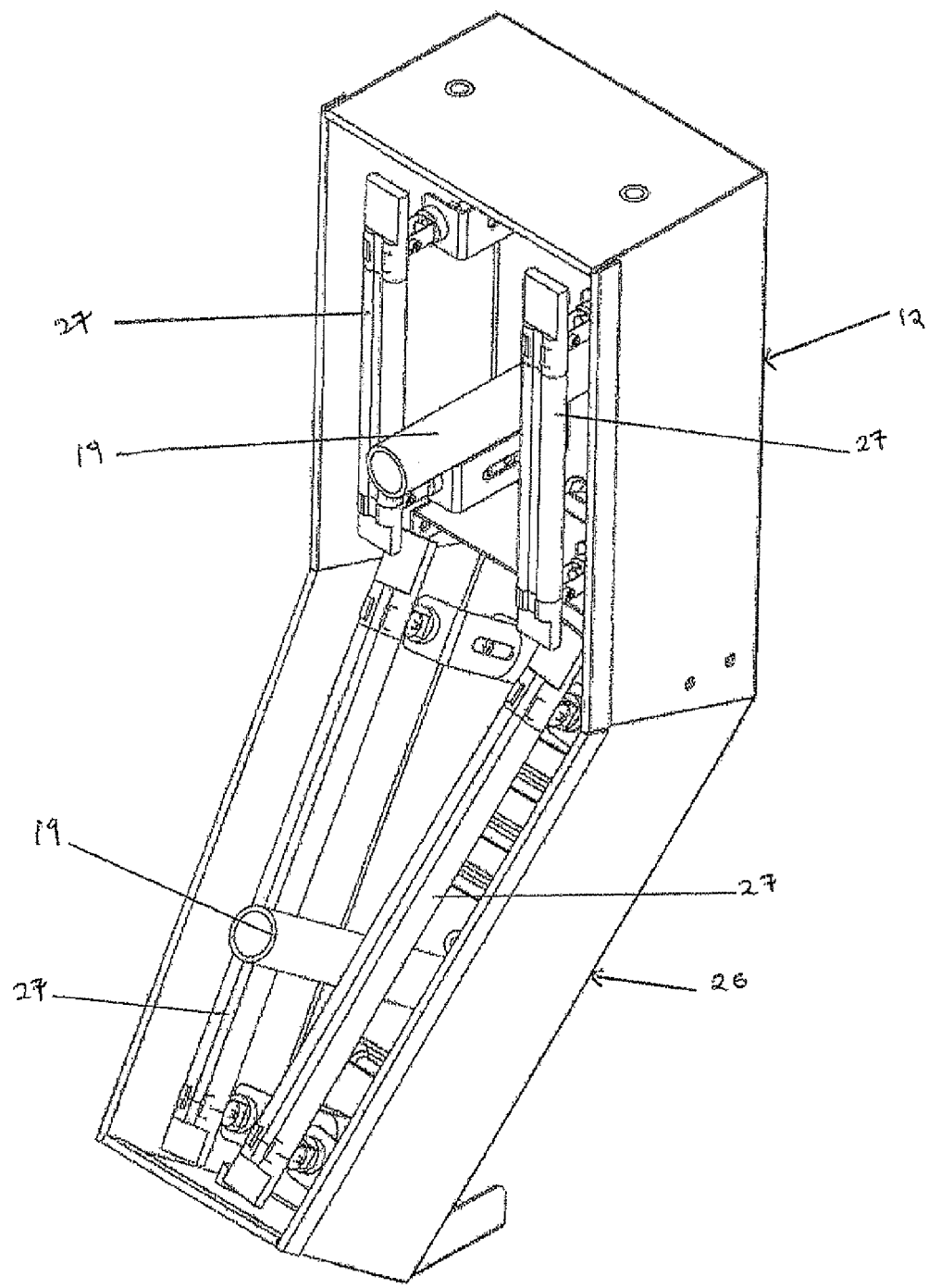
FIG. 6 shows an enlarged front perspective view of heating units of the heating apparatus.

As can be seen from FIG. 6, each heating unit 12,26 is provided with a pyrometer 19. Each pyrometer 19 is arranged to measure the temperature of the region of the surface of the pipe coating 4 that is being heated by the respective heating unit 12,26.

Figure 3:
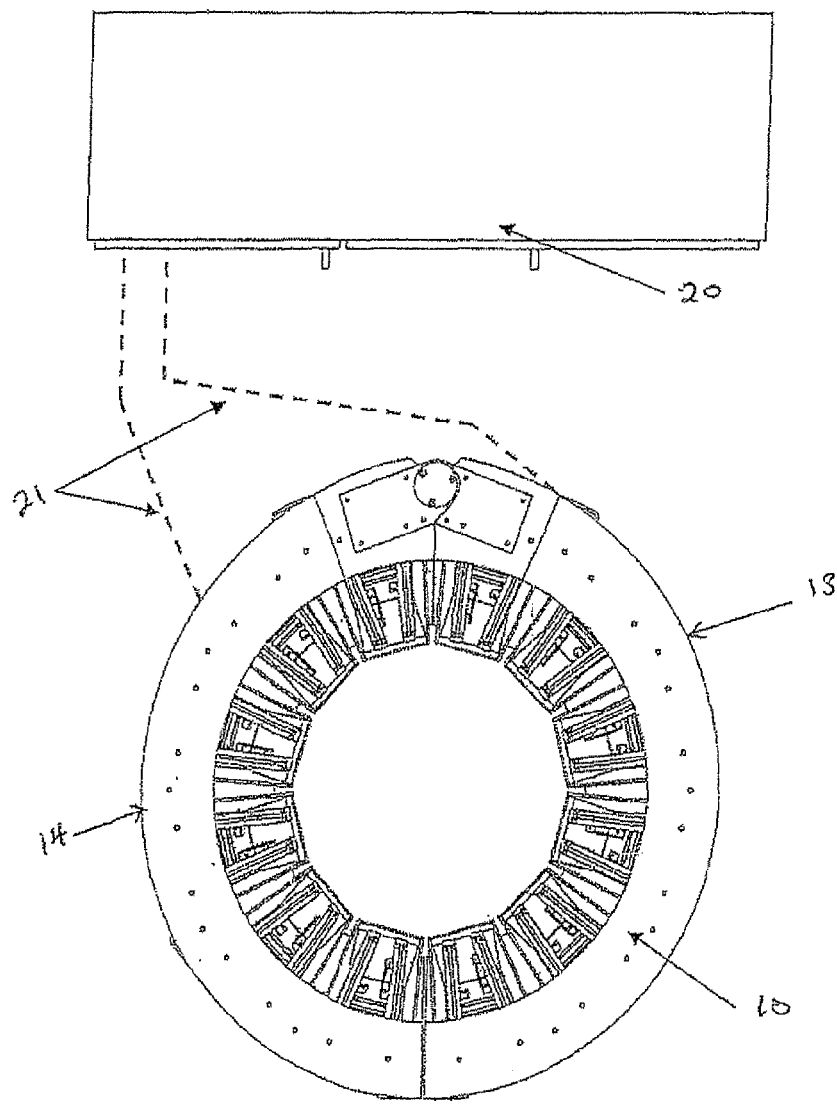
FIG. 3 shows a front elevational view of the heating apparatus shown in FIGS. 1 and 2, connected to a controller.

Referring now to FIG. 3, the heating apparatus further comprises a controller 20.

The controller 20 is operatively connected to the radiant heating tubes of the heating units 12 by power cables 21.

The controller is arranged to control each heating unit 12,26 individually, or to control selected groups of heating units individually.

Referring now to FIG. 1, each heating unit 12,26 is arranged to heat a different region 23,22.

The controller is also operatively connected to the pyrometers 19 of the heating units 12,26. The controller 20 is arranged to control the heat output by each of the heating units 12,26 in dependence on the temperature sensed by the pyrometer 19, of the region being heated.

This allows the temperature of the pipe coating 4 heated by heating units 12,26 in each region to be accurately monitored and controlled.

The controller 20 is arranged to receive a target temperature for each region of the surface of the pipe coating 4.

The controller 20 is arranged to use the measured temperature of each region by way of closed loop feedback control to control each heating unit such that the temperature of the surface of the pipe coating in each region is maintained at its respective target temperature.

In this way, different regions of the pipe coating may be heated differently. This accommodates differing responses of regions of the pipe coating to heating. These differing responses may, for example, be due to the spatial positions of the regions of the pipe coating.

For example, upper regions of the pipe coating may be subject to convected heat from lower regions of the pipe coating and therefore may not require as much heat to be applied directly to them. These differing responses may also, for example, be due to different materials of the regions, which have different specific thermal capacities.

The controller may also be arranged to control the heat output by one or more heating units 12,26 in dependence on the temperature sensed by the pyrometer 19, of the surface being heated, provided in a different region than the region the heating unit 12,26 is arranged to heat, for example an adjacent region.

The controller 20 is programmable and may be programmed to execute a variety of different heating cycles.

For example a target temperature can be set for each of the regions together with a run time. The controller 20 will control one or more heating units 12,26 to maintain a maximum temperature at the start of the cycle until the target temperature in the respective region is reached. Then the heat supplied to the region is controlled in dependence on the measured temperature of the region, using closed loop feedback control to hold the region of the surface at the target temperature, until a certain run-time has elapsed, at which point the controller 20 will deactivate the heating unit 12,26.

Alternatively the controller 20 may be programmed to control one or more heating units 12,26 to maintain a maximum temperature for a period of time, after which closed loop temperature control, as described above, will be applied for a further period of time. The maximum temperature to be applied by one or more of the heating units 12,26 at any time during the cycle can be limited by the controller 20.

Interlocking switches 25 are fitted to the frame 7 to prevent energisation of the heating units 12,26 unless the heating apparatus 1 is in the closed position.

Referring now to FIG. 1, there are shown first and second pipes 2, 3 that are connected in end to end relation to form part of a pipeline.

The pipes 2, 3 are each provided with a coating 4. The pipes 2, 3 are coated with a 5 layer polypropylene (5LPP) coating, as described above. However, it will be appreciated that any suitable pipe coating may be used. The coating 4 is applied to the pipes 2, 3 at a factory remote from the location in which they are to be laid.

The coating 4 is applied to the outside of the pipes 2, 3 and a short length 5 is left uncoated at either end of the pipes 2, 3. The uncoated lengths 5 are necessary to enable the adjacent ends of the pipes 2, 3 to be welded together to form a field joint 6. The ends of the pipe coating 4 are chamfered.

Before the pipeline can be laid the welded field joint 6 must be coated in the region of the joint to prevent corrosion of the pipes 2, 3. The coating 4 in this region will be referred to as the field joint coating.

Before this field joint coating is applied, it is necessary to heat the end regions of the pipe coating 4, of each pipe 2, 3 in order that the pipe coating 4 fuses with the field joint coating, when it is applied to the field joint 6.

In order to do this, the heating apparatus 1 in its open position is mounted onto the pipes 2, 3, over the field joint 6. The frame 7 of the heating apparatus 1 is then closed around the pipe, such that the heating apparatus is attached to the pipe.

The end regions 22, 23 of the coating 4 of the pipes 2, 3 are then heated by the heating units 12,26.

Each heating unit 12,26 heats a specific region 23,22 of the coating 4 of the pipes 2, 3.

The heating of each region 22, 23 is controlled by the controller 20, in dependence on the measured temperature of the surface of the pipe coating in the region by the respective pyrometers 19, using closed loop feedback control to maintain the region at the target temperature.

In order to heat a region, the respective heating unit is controlled to maintain a maximum temperature until a target temperature in the respective region is reached. Then the heat supplied to the region is controlled based on the measured temperature of the region, using closed loop feedback control to hold the region of the surface at the target temperature, until a certain run-time has elapsed, at which point the heating of the region is terminated.

Alternatively, in order to heat a region, the respective heating unit is controlled to maintain a maximum temperature for a fixed period of time, after which closed loop feedback control of the temperature, as described above, is applied until a certain run-time has elapsed. The maximum power to be applied at any time may be limited.

Once the end regions of the pipe coating 4 have been heated sufficiently, the heating units 12,26 are de-activated and the heating apparatus is opened and removed from the pipes 2, 3 and field joint 6.

The field joint 6 is then completely enclosed by a heavy duty mould that defines a cavity around the uncoated ends of the pipes, which is subsequently filled with molten polypropylene. Once the polypropylene has cooled and solidified, the mould is removed leaving the field joint coating in place.

The field joint coating provides similar or identical mechanical and thermal properties to the pipe coatings, as the factory applied coating and field joint coating materials are compatible thermosetting plastics. The compatibility of the pipe coating and field joint coating permits fusion to occur between the pipe and the field joint coatings. The fusion is such that the fused interface of the coatings is of sufficient mechanical strength to withstand stresses that may result from reeling the pipes and/or laying the pipes offshore.

The above embodiment is described by way of example. Many variations are possible without departing from the invention.

What is claimed is:

1. An apparatus for heating a pipe, comprising: first and second heating units mounted on a frame, at least one temperature sensor and a controller, wherein the controller is arranged to control the first and second heating units in dependence on the temperature measured by the temperature sensor, the first heating unit being substantially parallel to the longitudinal axis of the frame, wherein the second heating unit is inclined inwardly, relative to said longitudinal axis.

2. An apparatus according to claim 1, wherein the apparatus comprises a plurality of said heating units, with the heating units arranged such that in use they each primarily heat different regions of the pipe coating.

3. An apparatus according to claim 2, wherein the apparatus comprises a plurality of said temperature sensors, with the temperature sensors arranged to measure the temperature of different regions of the pipe coating.

4. An apparatus according to claim 3, wherein the controller and each heating unit and temperature sensor are arranged such that each heating unit may be controlled in dependence on the measured temperature of the region of the pipe coating that the heating unit is arranged to heat.

5. An apparatus according to claim 2, wherein the controller is arranged such that selected groups of the heating units may be controlled together.

6. An apparatus according to claim 2, wherein the controller is arranged such that each heating unit may be controlled individually.

7. An apparatus according to claim 1, wherein the first and second heating units are arranged to heat a surface of the pipe coating and/or the at least one temperature sensor is arranged to measure the temperature of a surface of the pipe coating.

8. An apparatus according to claim 1, wherein the first and second heating units are radiant heaters comprising electrical heating tubes of the type that reach operating temperature immediately after a power supply is applied and/or cool down quickly when the power supply is removed.

9. An apparatus according to claim 1, wherein the first and second heating units are radiant heaters of the type that emit short wave infra-red heat energy.

10. An apparatus according to claim 1, wherein the apparatus comprises a switch, which only allows activation of the first and second heating units when the frame is in the closed position.

11. An apparatus according to claim 1 wherein the apparatus is for heating the end regions of a coating of first and second pipes connected in end to end relation, comprising a plurality of said first and second heating units, wherein the heating units are mounted towards each end of the frame.

12. A method of heating a pipe coating, including providing an apparatus for heating a pipe coating having first and second heating units mounted on a frame, at least one temperature sensor, and a controller, the method comprising:
using at least one of the heating units to heat one or more regions of the surface of the pipe coating;
using the at least one temperature sensor to measure the temperature of the one or more regions of the surface of the pipe coating that is being heated by at least one of the heating units;
using the controller to control the first and second heating units in dependence on the temperature measured by the at least one temperature sensor wherein the first heating unit is substantially parallel to the longitudinal axis of the frame; and
wherein the second heating unit is inclined inwardly, relative to said longitudinal axis, to match the shape of a chamfered edge of the pipe coating.

13. A method according to claim 12, further comprising: the step of controlling the first and second heating units, using the temperature measured by the at least one temperature sensor, by way of closed-loop feedback control, to control the first and second heating units such that the temperature of one or more regions of the pipe is maintained at a target temperature.

14. A method according to claim 13, wherein the first and second heating units are controlled to maintain a maximum temperature until a target temperature is reached and then the heat supplied to the one or more regions is controlled in dependence on the measured temperature of the one or more regions, using closed loop feedback control to hold the one or more regions of the pipe coating at the target temperature.

15. A method according to claim 13, wherein the first and second heating units are controlled to maintain a maximum temperature for a first period of time and then the heat supplied to the one or more regions is controlled in dependence on the measured temperature of the one or more regions, using closed loop feedback control to hold the one or more regions of the pipe coating at a target temperature.

16. A method according to claim 12, further comprising heating a region of a coating of the pipe coating to an extent sufficient to allow the heated region of coating to fuse with a field joint coating.

17. An apparatus according to claim 11 wherein the heating units are circumferentially distributed around the periphery of the frame.

18. An apparatus according to claim 17 wherein the frame is adjustable between an open position and a closed position and the heating units are circumferentially disposed around the end region of the coating of the first and second pipes, when the frame is mounted on the pipes and is in the closed position.

* * * * *